United States Patent [19]

Miller

[11] 4,194,610
[45] Mar. 25, 1980

[54] WEAR COMPENSATED ELECTROMAGNETIC CLUTCH DEVICE

[75] Inventor: Donald L. Miller, Horseheads, N.Y.
[73] Assignee: Facet Enterprises, Inc., Tulsa, Okla.
[21] Appl. No.: 845,698
[22] Filed: Oct. 26, 1977
[51] Int. Cl.$^2$ .................. F16D 13/85; F16D 27/10
[52] U.S. Cl. .................... 192/111 A; 192/84 C; 188/196 BA
[58] Field of Search ............. 192/111 A, 111 B, 84 C; 188/196 BA, 79.5 GE

[56] References Cited

U.S. PATENT DOCUMENTS

| | | | |
|---|---|---|---|
| 3,214,084 | 10/1965 | Smirl | 192/111 A |
| 3,458,022 | 7/1969 | Reiff | 192/84 C |
| 3,677,377 | 7/1972 | Miller | 192/111 A |
| 3,679,034 | 7/1972 | Miller | 192/111 A |
| 3,789,966 | 2/1974 | Miller | 192/111 A |
| 3,994,379 | 11/1976 | Miller et al. | 192/84 C |
| 4,030,583 | 6/1977 | Miller | 192/84 C |
| 4,031,985 | 6/1977 | Ito | 188/196 BA |
| 4,071,118 | 1/1978 | Johannesen | 188/196 BA |

FOREIGN PATENT DOCUMENTS

| | | | |
|---|---|---|---|
| 1124772 | 3/1962 | Fed. Rep. of Germany | 192/111 A |
| 887056 | 1/1962 | United Kingdom | 192/111 A |

Primary Examiner—Benjamin Wyche
Assistant Examiner—David C. Reichard
Attorney, Agent, or Firm—Remy J. VanOphem

[57] ABSTRACT

An electromagnetic clutch device for transmitting torque from an input means to an output means includes a clutch actuating means in the form of an electromagnetic winding. The input means includes a driving plate coaxially disposed with and connected to an input shaft for rotation therewith, a driving friction ring member coaxial with the input shaft and connected to the driving plate for rotation with the input shaft and axial movement relative to the input shaft, and an armature coaxially disposed with and threadably connected to the friction ring member. The relative rotational motion between the armature and the output means causes the armature to advance on the thread thereby allowing the friction ring member to fully engage with the output means. The relative position between the armature and the driving friction ring member is maintained by a retarder disposed between the armature and the driving friction ring which permits relative rotational motion between the driving friction ring member and the armature in one direction while preventing relative motion in the opposite direction. In addition, a driving spring force reducer coacts with the driving plate and armature to bias the friction ring member toward the input means to compensate for the increased spring force exerted on the friction ring by the driving spring as the friction surface wears.

10 Claims, 6 Drawing Figures

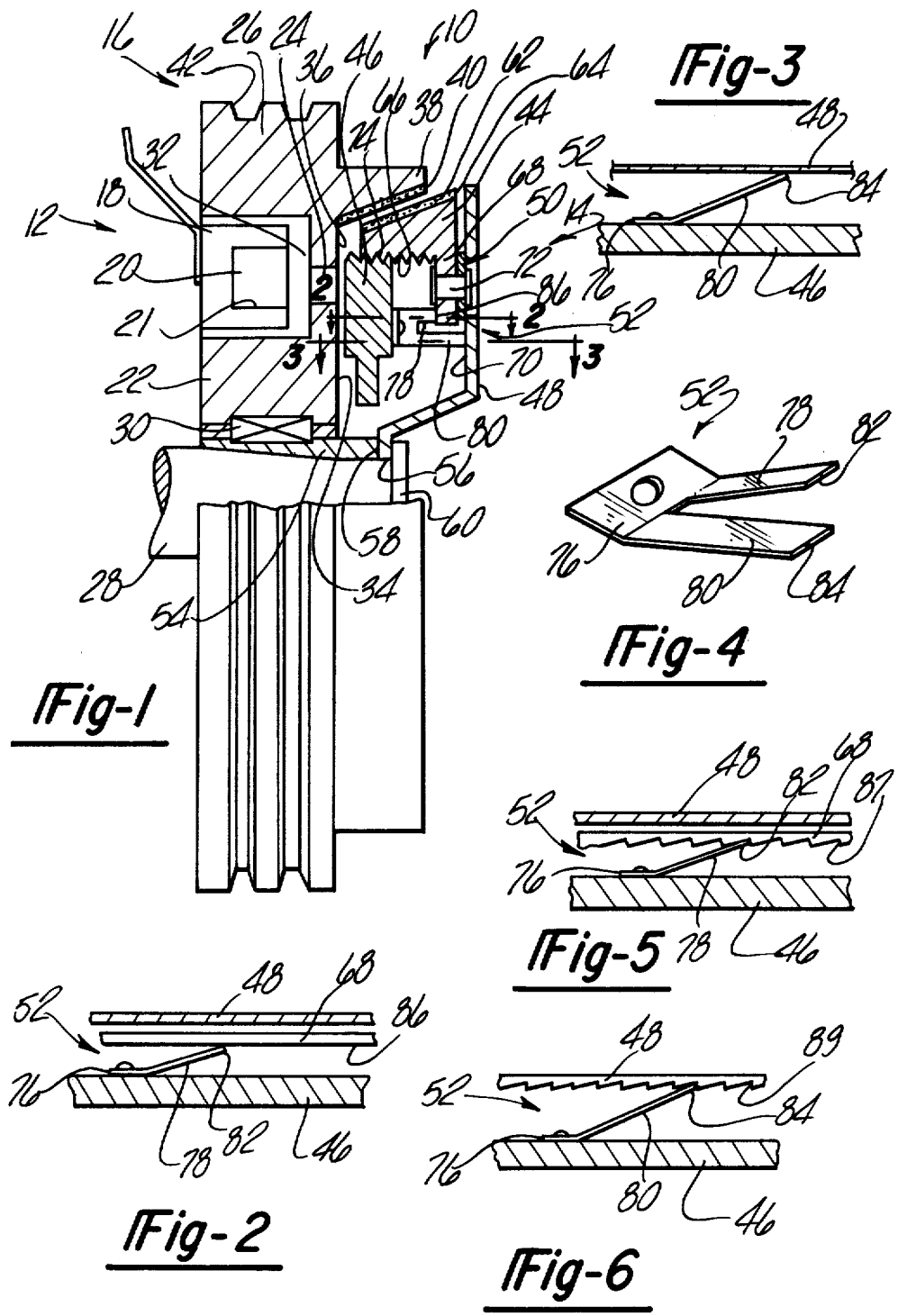

WEAR COMPENSATED ELECTROMAGNETIC CLUTCH DEVICE

BACKGROUND OF THE INVENTION

The present invention relates to electrically actuated friction devices and more particularly to an electromagnetically actuated self-adjusting clutch.

Electromagnetic actuated clutch devices have been found to be particularly desirable in applications wherein the transmission of power to a user of the power must be controlled and transmitted by clutch device having considerable compactness and longevity. Such an application is exemplified by a compressor in an air conditioning device. Such an application places particularly tough requirements on the clutch in that it must be simple and economically constructed and at the same time transmit a high torque output. In addition, the clutch may be either off or on for long periods of time or frequently cycled on and off over a short period of time depending upon the demands placed upon the air conditioning system in which it operates. Therefore, the clutch must be sufficiently durable to withstand constant use with a minimum amount of downtime for adjustment.

Heretofore, there have existed at least two recognizable types of electromagnetically actuated clutch constructions. One type, herein called the "cone" variation has inter-engaging friction surfaces between engageable rotatable clutch elements which are conically shaped and by their inherent geometrical configuration require a lower axial force to develop sufficient frictional locking of the working faces for rotation of the driven members. The other type, herein called the "disc" variation has inter-engaging friction faces which are generally disposed normal to the axis of the engageable rotatable clutch element and, in instances where the flux path passes through the friction faces, the armature pull is entirely axial. The disc type configuration is particularly advantageous due to its ability to provide a large axially directed flux path and thereby provides for a strong clutch engaging force.

Other prior art designs are known which combine the desirable characteristics of these two types of electromagnetic actuated clutches. One such design provides an armature ring element which is generally L-shaped in radial cross-section; the element has one annular pole piece with a frusto-conical face and another annular pole piece with a flat disc-like face disposed normal to the clutch axis. This design, however, has several drawbacks. For example, since the armature ring element is one piece, there is no means for compensating for wear of either pole piece. Further, the conical friction surface must be made of a magnetic material. In addition, the outer pole force is almost entirely in the radial direction instead of the preferred axial direction.

Another prior art design uses the same principle; threading the conical piece to the disc-like pole piece. This design has the added drawback of forcing the electric flux path through the threads which results in a loss in the generated clutching force produced by the electromagnetic actuating device.

Yet another prior art design such as that shown in U.S. Pat. No. 3,679,034 issued on July 25, 1972 to Miller provides a conical frictional element which is moved into engagement with a mutually engageable conical face on an output member by the use of a resilient torque transmitting member. The resilient torque transmitting member provides a sufficient force to disengage the mutually engageable conical surfaces when the electromagnetic force becomes de-energized. Since the force of the resilient disengaging torque transmission member is in a direction opposite to the direction of the force generated by the electromagnetic flux path, out of necessity it requires a greater electromagnetic force to engage the mutually engageable friction torque transmitting faces. Therefore, as wear occurs, the electromagnetic force required to engage the frictional faces becomes higher in magnitude since the resilient torque transmission has to be deflected a greater distance. Further adjusting for the wear on such prior art device causes adverse wear on the armature face opposite the pole face. This is a result of the centrifugal force acting on the adjusting means. The centrifugal force causes the adjusting means to be somewhat delayed thereby causing the pole face of the output member to come into contact with the armature while rotating for a sufficient duration of time to cause wearing of the armature face.

In some known devices, such as that shown in U.S. Pat. No 3,994,379 issued on Nov. 30, 1976 to Miller and Giometti, the frictional element threadably engages with a concentrically disposed armature thereby providing for axial movement of the frictional element relative to the armature as the frictional element wears. A substantial amount of heat is generated by the frictional element which could cause the threaded engagement to bind because of thermal expansion with the result that the frictional element would no longer freely move relative to the armature.

SUMMARY OF THE INVENTION

The present inventioin recognizes these drawbacks economical to manufacture and relatively maintenance free in operation.

More particularly, the present invention provides an electromagnetic friction device for transmitting torque from an input means to an output means. The clutch device includes an electromagnetic actuating coil. The input means includes a rotatably mounted and axially movable friction ring member which is coaxially disposed relative to the output means and an armature which is coaxial with the friction ring member and threadably connected to the friction ring member for axial movement therewith as well as axial and rotatable movement relative to the friction ring member. Upon energization of the electromagnetic actuating coil the friction ring member is pulled axially into driving contact with the output means thereby transmitting torque from the friction ring member of the input means to the output means. A unidirectional retarder is provided between the armature and friction ring member to allow rotation of the armature relative to the friction ring member in only one direction preventing undue wear of the armature and threads of the friction ring member to maintain these threads in mutual contact. In addition, the input means includes a drive spring device which biases the friction ring member axially away from the output means for disengaging the frictional ring member from the output means upon de-energization of the electromagnetic actuating coil, and a drive spring force reducing spring device which biases the friction ring member toward the output means to, at least particularly, counter the increasing drive spring force generated by the drive spring device as the friction ring wears in use.

It is an object of this invention to provide an electromagnetically actuated clutch having high torque transmission capability in a compact housing.

It is another object of this invention to provide a self adjusting electromagnetically actuated clutch with wear compensating means which is not adversely affected by centrifugal force.

Another object of this invention is to provide an electromagnetically actuated clutch in which the electromagnetic engaging force is unaffected by wear of the torque transmitting member, thus, ensuring a strong magnetic engaging force regardless of the amount of wear of the friction ring transmitting member.

Still a further object of this invention is the provision of a unique means for maintaining a threaded engagement of a friction ring member to an armature to assure constant torque transmission.

It is another object of this invention to provide an efficient electromagnetically actuated clutch with a new and economical wear compensating means.

Other objects and advantages of this invention will become apparent from the following description.

BRIEF DESCRIPTION OF THE DRAWINGS

One possible embodiment of the present invention is illustrated in the accompanying drawings wherein like numerals refer to like parts throughout the several views, and in which:

FIG. 1 is a fragmentary sectional view of a clutch device showing the various clutch elements in a disengaged position;

FIG. 2 is a fragmentary sectional view taken along section 2—2 in FIG. 1;

FIG. 3 is a fragmentary sectional view taken along section 3—3 in FIG. 1; and,

FIG. 4 is an enlarged perspective view of one component of the clutch device of FIG. 1.

FIG. 5 is a fragmentary sectional view identical to that of FIG. 2, but illustrating another advantageous embodiment of one of the components of the present invention; and, FIG. 6 is a fragmentary sectional view identical to that of FIG. 3, but illustrating another advantageous embodiment of one of the components of the present invention.

DESCRIPTION OF THE PREFERRED EMBODIMENT

With reference to FIG. 1, there is shown an electromagnetic friction device or clutch 10 for transmitting torque to drive, for example, a compressor of an air conditioning system.

The electromagnetic friction device 10 is comprised of an electromagnetic clutch actuating means 12, an input means 14 and an output means 16.

The electromagnetic clutch actuating means comprises a stationary electric flux conducting housing 18 which is preferably annular in shape. An electromagnetic coil 20, also preferably annular in shape, is disposed within an annular cavity 21 formed in the flux conducting housing 18. The electromagnetic coil 20 may be manufactured from copper wiring or other suitable material and is suitably connected to a source of electrical energy by any convenient circuitry and control devices (not shown).

The output means 16 comprises three concentrically disposed sections 22, 24 and 26 which are connected together to form a unitary body. Two separate flux conducting surfaces are established by fabricating the innermost section 22 of a conducting material, the intermediate section 24 of a non-conducting material, and the outermost section 26 of a conducting material. This feature of electromagnetic clutches, i.e., establishing two poles, is well known in the art and will, therefore, not be further discussed.

The output means 16 is concentrically disposed with and rotatably mounted on an input shaft 28 for rotation about the longitudinal axis of the input shaft 28. This is accomplished by means of a conventional roller bearing 30 disposed between the innermost section 22 and the input shaft 28. Thus, the output means or body 16 is mounted to the input shaft, but is free to rotate about its longitudinal axis. In addition, the output body 16 has an annular cavity 32 formed therein generally coaxial with the input shaft 28 which receives the stationary flux conducting housing 18.

The innermost section 22 and the outermost section 26 have pole faces 34 and 36, respectively. These pole faces 34 and 36 are located opposite from the cavity 32 and are disposed in a plane generally normal to the longitudinal axis of the input shaft 28.

The outermost section 26 has an annular frusto-conical section 38 which is adapted to engage with the input means. The frusto-conical section 38 has a sloping surface 40 which tapers radially toward the interior of the central axis of friction device. The frusto-conical section 38 is the principle torque carrying member of the output means 16. Although the frusto-conical section 38 is shown as being integrally formed and a part of the outermost section 26 of the output body 16, it is possible to form this conical section 38 from a friction material and secure it to the outermost section 26. Furthermore, it is possible to fasten a friction material to the sloping surface 40 of the frusto-conical section 38. The use of magnetically non-conductive materials for the torque carrying frusto-conical section 38 of the output means 16 is possible because the flux path is not required to pass through the torque transmitting portions of the clutch 10.

The outermost section 26 of the output means 16 is operatively connected to a user of the torque, such as an air conditioning compressor, to be transferred by the clutch 10. In the illustrated embodiment, the outermost section 26 is formed with a plurality of grooves 42 in its periphery which are adapted to receive, for example, conventional V-belts. The V-belts interconnect the air conditioning compressor (not shown), with the clutch 10. Thus, as the output body 16 is caused to rotate about the input shaft 28, as will be hereinafter described, the V-belts are driven thereby transferring the torque from the output body 16 to the compressor.

The input means 14 is coaxially and adjacently disposed with the output means 16, and comprises the input shaft 28, a rotatable principle torque transmitting cone member or friction ring member 44, an armature member 46, a driving plate 48 connected to the input shaft 28, a drive spring 50 interconnecting the driving plate 48 to the friction ring member 44 and a retarder and drive spring force reducing member 52.

The driving plate 48 is coaxially disposed with the input shaft 28 and is attached to the input shaft 28 for rotation therewith. The attachment of the driving plate 48 to the input shaft 28 can be accomplished in any one of a number of different ways. The attachment illustrated in FIG. 1 includes an input shaft collar 54 disposed over the input shaft 28. The collar 54 is affixed to the input shaft 28 for rotation therewith by a standard key which is received in mating keyways (not shown) in the collar 54 and input shaft 28. The driving plate 48 has a coaxial aperture 56 which receives the input shaft 28 therethrough. The portion of the driving plate 48 adjacent the aperture 56 is seated in an appropriate shoulder 58 formed in the collar 54 and tightly caged therein by way of locking means, such as a conventional nut 60 threaded onto the adjacent end of the input shaft 28.

The friction ring member 44 is coaxially disposed with the input shaft 28. The ring member is generally frusto-conically shaped in axial cross-section, and comprises a radially inwardly sloping peripheral surface 62 which is complimentary with and adapted to contact the sloping surface 40 of the frusto-conical section 38 of the output body 16. As illustrated, a friction material 64 is mounted to the sloping peripheral surface 62 to increase the frictional forces generated between the frusto-conical section 38 of the output body 16 and sloping surface 62 of friction ring member 44 upon mutual engagement. The inner cylindrical surface 66 of the friction ring member 44 is threaded along the entire thickness of the friction ring member 44. The threads can be of conventional screw thread form, or a ball thread form, or any other convenient form. The friction ring member 44 further comprises an annular flange 68 which extends radially inwardly of the friction ring member from peripheral surface 62 at the end of the ring member 44 having the largest diameter, and at approximately a right angle to the threaded inner cylindrical surface 66 of the ring member 44.

The friction ring member is disposed between the input body 14 and the driving plate 48, and is attached to the driving plate 48 for rotation with it, and thus for rotation with the input shaft 28, by means of a plurality of the drive spring members 50. Each drive spring 50 is illustrated as being in the form of a flat leaf spring although other spring shapes can conceivably be used. The leaf type drive spring members 50 are arranged in a circular array between the driving plate 48 and radially extending flange 68 of the friction ring member 44. Each leaf type drive spring member is attached at one of its ends to the driving plate 48 and at the other of its ends to the radially extending flange 68 of the friction ring member 44. Any convenient attachment means may be used to attach the driving spring to the driving plate and radially extending flange. For example, rivets 72 are used in the illustrated embodiment. In addition to connecting the driving plate 48 to the friction ring member 44, the drive spring 50 also produces an axial biasing force on the ring member 44 in an axial direction away from the output body 16.

The annular armature member 46 is also coaxially disposed with the input shaft 28 and has a threaded peripheral surface 74 which is threadably connected to the threaded inner cylindrical surface 66 of the friction ring member 44. Thus, the annular armature member is generally concentrically disposed with the friction ring member 44, rotates with the ring member as the ring member rotates with the input shaft 28 and is axially and rotatably movable relative to the annular friction ring member along the threaded connection therebetween.

Referring to FIGS. 2-4, the retarder and drive spring force reducing member 52 is comprised of a mounting flange 76 with two spring-like fingers 78 and 80 extending therefrom. In the illustrated embodiment, one spring-like finger, for example finger 80, is longer than the other spring-like finger, for example finger 78. The retarder and drive spring force reducing member 52 is attached to the annular armature 46 at its mounting flange 76 by means of, for example, rivets.

As can be seen in FIGS. 1 and 2, the retarder and drive spring force reducing member 52 is disposed such that the shorter spring-like finger 78 extends between the armature 46 and the radially extending flange 68 of the friction ring member 44 with the free end 82 (shown in FIG. 5) of the spring-like finger 78 abutting the annular surface 86 of the radially extending flange 68, and exerts an axial force against the flange 68. The armature 46 will be allowed to rotate in one direction on the threaded connection between it and the friction ring member 44, but will be prevented from rotating in the opposite direction by the frictional force generated between the free end 82 of spring-like finger 78 and the facing annular surface 86 of the radially extending flange 68. The axial force generated between the armature 46 and flange 68 of the friction ring member 44 not only functions to maintain the free end 82 of spring finger 78 against the facing annular surface 86 of the radially extending flange 68, but also constantly forces the threads of threaded surface 66 against and into contact with the threads of the threaded peripheral surface 74 regardless of the amount of space between the threads. Therefore, the threaded surfaces 66 and 74 can be made with a sufficiently large enough clearance or tolerance therebetween to compensate for thermal expansion of the threads due to heat generated by the clutch when it is engaged, but still remain in mutual contact when the threads have not yet expanded. Likewise, of course, the axial force produced by the spring-like finger 78 also continues to force the threads 66 and 74 into constant mutual contact as they wear in use, thus, extending the life of the clutch.

As can be best seen in FIGS. 1 and 3, the retarder and drive spring force reducing member 52 is also disposed such that the other longer spring-like finger 80 extends between the armature 46 and the driving plate 48 with the free end 84 of the spring-like finger 80 in contact with the driving plate 48 and exerts an axial force against the driving plate surface 70 which biases the friction ring member 44 in a direction toward the output body 16, i.e., in the opposite direction in which the drive springs 50 bias the friction ring member 44.

It is contemplated that in some installations a more positive engagement exists between the free end 82 of the spring-like finger 78 and the annular surface 86 of the radially extending flange 68. With reference to FIG. 5, this more positive engagement can be provided by texturizing the annular surface 86 of the flange 68, shown in FIG. 2, as by, for example, knurling or forming a ratchet type surface 87 thereon in an annular arrangement coaxial with the input shaft 28 shown in FIG. 1. The free end 82 of the spring-like finger 78 will engage the knurled or ratchet surface 87 to allow the armature 46 to rotate in one direction on the threaded connection between it and the friction ring member 44, but prevent rotation of the armature 46 in the opposite direction by the interfering engagement of the free end 82 of the spring-like finger 78 with the knurled surface 87.

It is also contemplated that the surface of the driving plate 48 contacted by the free end 84 of the longer spring finger 80 may have a knurled surface 89 as does that portion of the extending flange 68 in contact with the free end 82 of the shorter spring finger 78 to further assure rotation of the armature 46 relative to the friction ring member 44 in only one direction as can be seen in FIG. 6. It should be understood that a plurality of retainer and drive spring force reducing members 52 are spaced annularly around the armature. It should also be remembered that surfaces 87, 89 represent alternative embodiments as shown in FIGS. 5 and 6 only.

OPERATION

In operation, initially the armature 46 is moved axially into engagement with the pole faces 34 and 36 of the output body 16 when the electromagnetic coil is energized. The magnetic engaging forces exerted on the armature 46 are completely axial and, therefore, provide a closed contact between the pole faces and the armature. At this time, the peripheral surface 62 of the friction ring member 44 will be axially spaced from the corresponding tapering friction surface 40 of frusto-conical section 38 of the output body 16. As the armature 46 moves axially toward the pole faces 34 and 36, the rotational velocity of the armature is decreased by the static condition of the output body 16. The friction ring member 44, which continues to rotate at the speed of the input shaft 28, is caused to move axially forward toward the output body 16 along the mutually engaged threaded surfaces 66 and 74 between the armature and friction ring member due to the differential rotational velocity between the friction ring member 44 and armature 46. Thus, the sloping peripheral surface 62 of the friction ring member 44 is moved into engagement with the conforming tapered surface 40 on frusto-conical section 38 of the output body 16. As the friction ring member 44 moves toward the output body 16, the drive springs 50 deflect thereby generating an axial force on the friction ring member in a direction axially away from the output body 16. When the electromagnetic winding 20 is de-energized, the armature member 46 and the friction ring member 44 are axially withdrawn from the output body 16 by the influence of the biasing force applied to the deflected drive springs 50. Upon de-energization the armature member 46 and the friction ring member rotate at the same speed. Relative motion between the armature and friction ring member is not possible due to the nature of the design of the retarder and drive spring force reducing member 52. The spring fingers 78 and 80 of the member 52 act upon the (optionally) knurled surfaces 87 and 89, respectively, in such a way so as to prevent relative movement between the armature 46 and friction ring member 44 upon de-energization of the electromagnetic coil. The armature and friction ring member remain in exactly the same position, relative to each other, as they were when the electromagnetic coil was energized with the friction ring member in contact with the output body 16. Therefore, when the electromagnetic coil is again energized, the armature and friction ring member 44 will move toward the pole faces 34, 36 of the output body 16 until the friction peripheral surface 62 of ring member 44 again engages the tapered friction surface 40 of the output body 16 as before.

In the embodiment of FIGS. 2 and 3, the abutment of the spring finger 78 against the annular surface 86 of the radially extending flange 68 and the spring finger 80 against the driving plate 48 will only permit the armature to rotate in one direction relative to the friction ring member 44.

Likewise, in the embodiment of FIGS. 5 and 6, the engagement of the spring fingers 78 and 80 with the knurled surfaces 87 and 89 will also only permit the armature 46 to rotate in one direction relative to the friction ring member 44. The only way relative motion between the armature and friction ring member will be permitted to occur is when the friction surfaces 40 and 62 wear away. As wear occurs, the same basic cycle as described above is repeated to re-establish contact between the tapered friction surface 40 and sloping friction surface 62 of the output body member 16 and friction ring member 44, respectively. Note that as wears occurs, there is no loss of torque transfer between the friction ring member 44 and the output body 16. The movement between the armature 46 and the friction ring member 44 is immediate and automatically adjusts the position of the friction ring member 44 relative to the output body 16 to compensate for wearing of the friction surfaces 40 and 62.

As the friction surfaces 40 and 62 wear, the position of the friction ring member 44 is adjusted such that it progressively is farther and farther axially spaced from the driving plate 48. Thus, the drive springs 50 are caused to increasingly deflect in a direction toward the output body 16. As the drive springs deflect more and more, the axial biasing force they generate on the friction ring member 44 in a direction away from the output body 16 necessarily increases. This biasing force of drive springs 50 is counter the electromagnetic engaging force generated by the electromagnetic coil 20 and, therefore, results in a decreasing net clutch engaging force as the friction surfaces 40 and 62 wear away. However, the spring finger 80 coacting with the driving plate 48 biases the friction ring member 44 axially toward the output body 16, thus counteracting at least a portion of the increasing biasing force of the drive springs 50 so that the net clutch engaging force generated by the electromagnetic coil 20 remains relatively constant regardless of the amount of wear of the friction surfaces 40 and 62.

The foregoing detailed description is given primarily for clarity of understanding and no unnecessary limitations should be understood therefrom, for modifications will be obvious to one skilled in the art upon reading this disclosure and may be made without departing from the spirit of the invention or the scope of the appended claims.

I claim:

1. An electromagnetic friction device for torque transmission comprising:

torque output means;

torque input means coaxially disposed with said output means, said input means comprising:

a rotatably and axially adjustable friction ring member movable toward and away from said output means for selective engagement with and disengagement from said output means;

an annular armature rotatably connected to said friction ring member so as to be axially moveable relative thereto;

first means for biasing said friction ring member away from said output means;

unidirectional retarder means for allowing rotational motion of said armature relative to said friction ring member in one direction while preventing rotational motion in the opposite direction; and second means for biasing said friction ring member toward said output means, at least partially counteracting the force of said first means for biasing said friction ring member away from said output means; and electromagnetic means for selectively producing a magnetic force which moves said friction ring member toward and into engagement with said output means against the force of said first means for biasing said friction ring member away from said output means.

2. The electromagnetic frictional device defined in claim 1 wherein said input means comprises:
an input shaft coaxially disposed with said output means; and,
means interconnecting said friction ring member to said input shaft for rotation with said input shaft.

3. The electromagnetic frictional device defined in claim 2, wherein:
said annular armature is coaxially disposed and axially movable with respect to said input shaft for movement toward and away from said output means, further having an outer cylindrical helical threaded surface;
said friction ring member has an inner cylindrical helical threaded surface threadably engaging the outer cylindrical threaded surface of said annular armature to provide relative axial movement and relative rotational movement between said friction ring member and said annular armature; and,
means for exerting an axial force between said inner cylindrical helical threaded surface of said friction ring member and said outer cylindrical helical threaded surface of said annular armature to maintain said helical threaded surfaces in mutual contact.

4. The electromagnetic device defined in claim 3, wherein said means for exerting an axial force between said inner cylindrical helical threaded surface of said friction ring member and said outer cylindrical helical threaded surface of said armature comprises biasing means coacting between said friction ring member and said annular armature.

5. The electromagnetic device defined in claim 3, wherein said means for exerting an axial force between said inner cylindrical helical threaded surface of said friction ring member and said outer cylindrical helical threaded surface of said annular armature, and said unidirectional retarder means are one and the same.

6. The electromagnatic frictional device defined in claim 2, wherein said means interconnecting said friction ring member to said input shaft comprises:
a driving plate coaxially disposed with and connected to said input shaft for rotation therewith; and,
a drive spring member interconnecting said driving plate and said friction ring member.

7. The electromagnetic frictional device defined in claim 6, wherein said drive spring member and said first means for biasing said friction ring member away from said output means are one and the same.

8. The electromagnetic frictional device defined in claim 6, wherein said second means for biasing said friction ring member toward said output means coacts between said annular armature and said driving plate in an axial direction of said input shaft.

9. An electromagnetic clutch device for torque transmission comprising:
an input shaft;
output means coaxially disposed with said input shaft and free to rotate thereon, said output means having an annular frictional face and an annular pole face disposed substantially normal to the longitudinal axis of said input shaft;
an annular armature coaxially disposed with said input shaft adjacent to said pole face of said output means, said armature being movable axially of said input shaft for movement toward and away from said pole face of said output means, said armature having an outer cylindrical threaded surface;
a driving friction annular ring member having an inner cylindrical threaded surface threadably engaging the outer cylindrical threaded surface of said annular armature and an annular friction face complimentary to said frictional face of said output means, said driving friction annular ring member being movable axially of said input shaft with said armature so that said friction face of said ring member engages said friction face of said output means as said ring member moves with said armature toward said pole face of said output means and disengages from said friction face of said output means as said ring member moves with said armature away from said pole face of said output means;
means for interconnecting said friction annular ring member to said input shaft for rotational movement therewith and also for axially biasing said annular ring member and said armature in a direction axially away from said pole face of said output means;
unidirectional retarder means operatively associated with said frictional annular ring member and said annular armature for allowing rotational motion of said armature in one direction relative to said frictional annular ring member while preventing rotational motion in the opposite direction;
means for biasing said frictional annular ring member and said armature axially toward said pole face of said output means, at least partially counteracting the force of said means for interconnecting said friction ring member to said output shaft and also for axially biasing said annular ring member and said armature in a direction axially away from said pole face of said output means; and,
electromagnetic means for selectively producing a magnetic force which moves said friction ring member and said armature toward said pole face of said output means.

10. In combination with an electromagnetic clutch of the type wherein torque is transmitted from an input means to an output means upon energizing an electromagnetic coil means and wherein an armature is disposed coaxially with said clutch axis for engagement with a magnetic pole face on said output means, said armature having an outer cylindrical helical threaded surface, and an annular driving friction ring member having an inner cylindrical helical threaded surface engaging the outer cylindrical helical threaded surface of said armature, the improvement which comprises:
means for rotatably driving and also for axially biasing said annular driving friction ring member in a direction axially away from said magnetic pole face on said output means;
unidirectional retarder means operatively associated with said annular driving friction ring member and said armature for allowing rotational motion of said armature in one direction relative to said annular driving friction ring member while preventing rotational motion in the opposite direction;
means for exerting an axial force between said inner cylindrical helical threaded surface of said annular driving friction ring member and said outer cylindrical helical threaded surface of said armature to compensate for wearing of these helical threaded surfaces; and, means for biasing said annular driving friction ring member and said armature axially toward said pole face on said output means to, at least partially, counteract the force of said means for rotatably driving which biases said ring member and said armature in a direction axially away from said pole face of said output means.

* * * * *